Patented Aug. 12, 1930

1,772,523

UNITED STATES PATENT OFFICE

ERNEST HARRY RODD AND FRANK WILLIAM LINCH, OF BLACKLEY, MANCHESTER, ENGLAND, ASSIGNORS TO BRITISH DYESTUFFS CORPORATION LIMITED, OF MANCHESTER, ENGLAND

PROCESS FOR PREPARING TRIARYLMETHANE DYES

No Drawing. Application filed February 2, 1928. Serial No. 251,458, and in Great Britain April 17, 1926.

In our co-pending application Serial No. 155,098, we have described a process for the manufacture of triaryl-carbinols which by conversion into salts form dyestuffs, consisting in treating a tetraalkyldiaminodiaryl ketone with an alkali metal and with an aryl halide. The value of this new process lies not only in the preparation of known dyestuffs by a new synthesis, but also in the preparation of dyestuffs obtainable with difficulty, or not at all, by previous methods. In the specification we have particularly described the manufacture of p:p'-tetramethyldiamino-diphenyl-o-tolyl-carbinol by treating Michler's ketone with chlorotoluenes.

Instead of chlorotoluenes, chloroxylene may be added, similar dyestuffs being obtained.

The present invention relates to a process for producing 4:4'-tetraalkyldiaminodiphenylaryl carbinols having the formula

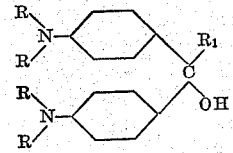

in which R represents an alkyl group and $R_1$ represents a xylyl group. German Patent No. 178,769, discloses a different method of producing one specific compound of the above general type. The method of the German patent is however limited to the production of a specific carbinol in which a meta-xylene residue is coupled to the carbinol grouping. By the process of the German patent it is not possible to produce compounds containing other hydrocarbon residues; not even ortho or para-xylyl residues. The present method is a marked improvement over the German process. The present method can produce not only compounds in which meta-xylyl residues are coupled in various positions to the carbinol grouping depending upon the position substituted by the halogen atom but also compounds in which ortho and para-xylyl residues are coupled to the carbinol group.

The following example is given merely to illustrate the present method and in no way limits the invention, as any 4:4'-tetraalkyldiaminodiphenylketone and any halogen substituted xylene may be used in the present process.

Example.

4.7 parts of Michler's ketone, 3.7 parts of 4-chloro-m-xylene, 1.2 parts of sodium and 25 parts of toluene are heated for 12 hours, with stirring, at 100° C.; at the end of this time no sodium remains. Toluene is removed by a current of steam, the carbinol is dissolved in oxalic acid and the dyestuff crystalized as oxalate. It gives bluish-green shades on tannin-mordanted cotton. The melting point of the p:p'-tetramethyldiamino-diphenyl-4-m-xylyl-carbinol is 145° C. The reaction appears to take place according to the equation.

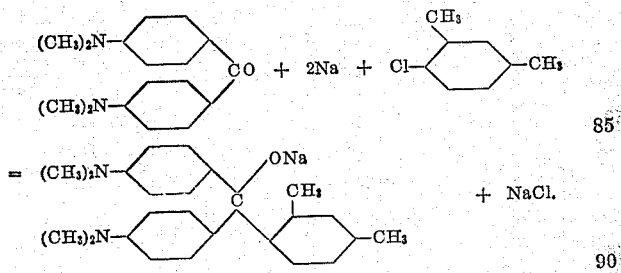

Other chloroxylenes give similar dyestuffs.

What we claim and desire to secure by Letters Patent is:—

1. In the manufacture of tetra-methyldiamino-diphenyl-xylyl carbinol the process which comprises condensing Michler's ketone with a chloroxylene.

2. In the manufacture of p:p'-tetramethyldiamino-diphenyl-4-m-xylyl-carbinol, the process which comprises condensing Michler's ketone with 4-chloro-m-xylene in the presence of sodium and toluene.

3. As a new product, p:p'-tetramethylldiamino-diphenyl-4-m-xylyl-carbinol having the structural constitution

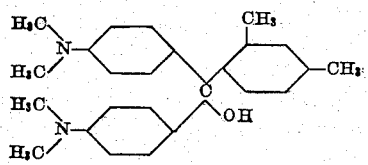

and melting at 145° C., the said p:p'-tetramethyldiamino-diphenyl-4-m-xylyl-carbinol being converted by acids into salts which dye tannin-mordanted cotton in bluish-green shades.

In testimony whereof we affix our signatures.

ERNEST HARRY RODD.
FRANK WILLIAM LINCH.